(12) United States Patent
Redekop

(10) Patent No.: US 9,826,671 B2
(45) Date of Patent: Nov. 28, 2017

(54) TILLAGE IMPLEMENT

(71) Applicant: Johan Redekop, Winkler (CA)

(72) Inventor: Johan Redekop, Winkler (CA)

( * ) Notice: Subject to any disclaimer, the term of this patent is extended or adjusted under 35 U.S.C. 154(b) by 345 days.

(21) Appl. No.: 14/633,700

(22) Filed: Feb. 27, 2015

(65) Prior Publication Data

US 2016/0249519 A1 Sep. 1, 2016

(51) Int. Cl.
*A01B 21/08* (2006.01)

(52) U.S. Cl.
CPC ............ *A01B 21/08* (2013.01); *A01B 21/083* (2013.01)

(58) Field of Classification Search
CPC .................................................... A01B 21/083
USPC .................................................. 172/314, 441
See application file for complete search history.

(56) References Cited

U.S. PATENT DOCUMENTS

| | | | | |
|---|---|---|---|---|
| 2,905,255 A | * | 9/1959 | Kampe ................ | A01B 21/083 172/441 |
| 2,952,325 A | * | 9/1960 | Toland ................. | A01B 21/08 172/581 |
| 3,191,691 A | * | 6/1965 | Newkirk ............... | A01B 21/08 172/584 |
| 3,223,178 A | * | 12/1965 | Clifford et al. ...... | A01B 21/083 172/441 |
| 7,000,708 B2 | * | 2/2006 | Powell et al. ....... | A01B 23/046 172/600 |
| 8,534,374 B2 | * | 9/2013 | Hake et al. ........... | A01B 21/08 172/599 |
| 2012/0312569 A1 | | 12/2012 | Redekop | |

* cited by examiner

*Primary Examiner* — Thomas B Will
*Assistant Examiner* — Joel F. Mitchell
(74) *Attorney, Agent, or Firm* — Ryan W. Dupuis; Ade & Company Inc.

(57) ABSTRACT

A tillage implement includes a main frame with adjustable toolbar sections thereon which each support respective tillage units thereon for engaging the ground. Each toolbar section has a first end portion coupled to the main frame by a first mounting assembly and an opposing second end portion which is coupled to the main frame by a second mounting assembly. Each one of the first and second mounting assemblies comprises a track and each of the first and second end portions of each toolbar section comprise a follower in mating engagement with the corresponding tracks. The track of the first mounting assembly is oriented closer to the lateral direction than the track of the second mounting assembly such that each toolbar section is pivotal about a respective upright axis generally at the first end portion when the toolbar section is displaced in the forward working direction at the second end portion.

13 Claims, 6 Drawing Sheets

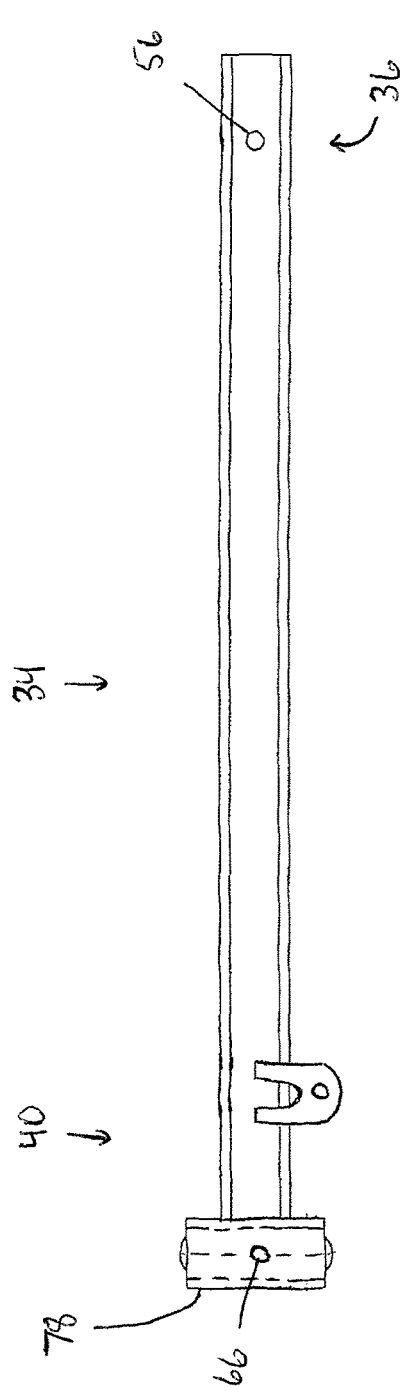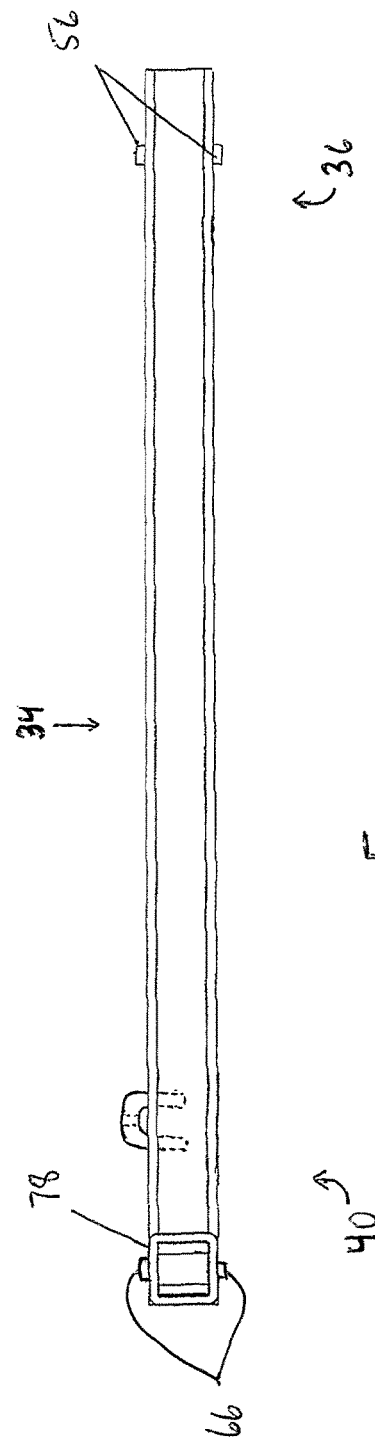
FIG. 7
FIG. 8

TILLAGE IMPLEMENT

FIELD OF THE INVENTION

The present invention relates to a tillage implement comprising a frame which supports a plurality of toolbar sections having coulter disk tillage units supported thereon such that the toolbar sections are adjustable relative to the frame, and more particularly the present invention relates to a tillage implement in which the toolbar sections are angularly adjustable relative to the frame by a track and follower at each end portion of the respective toolbar section.

BACKGROUND

One known construction of coulter disk vertical tillage implements having toolbar devices which are angularly adjustable relative to a forward working direction comprises a ball and socket-like assembly, as in U.S. Patent Application Publication No. 2012/0312569, for affording the respective toolbar device to slide laterally relative to the frame of the vertical tillage implement and to pivot about an upright axis at the ball and socket-like assembly.

The applicant provides a unique solution which may achieve similar functionality to the toolbar device of the prior art reference.

SUMMARY OF THE INVENTION

According to one aspect of the invention there is provided a tillage implement comprising:
  a main frame supported for movement across the ground in a forward working direction;
  a hitch arranged for connection to a towing vehicle;
  a plurality of toolbar sections supported on the main frame so as to be oriented transversely to the forward working direction;
  each toolbar section extending in a respective longitudinal direction between a first end portion which is coupled to the main frame by a respective first mounting assembly and an opposing second end portion which is coupled to the main frame by a respective second mounting assembly such that the toolbar section is angularly adjustable relative to the forward working direction;
  a plurality of tillage units supported on the toolbar sections respectively, each tillage unit comprising:
    a trailing arm extending generally rearwardly from a forward end supported on the respective toolbar section to an opposing trailing end such that the trailing end is movable upwardly from a normal working position to a deflected position;
    a coulter disk supported on the trailing end of the trailing arm so as to be arranged for tilling the ground; and
    a biasing member arranged to bias the trailing arm downwardly towards the normal working position;
  each first mounting assembly supporting the first end portion of each toolbar section such that each toolbar section is:
    slidable relative to the frame in a lateral direction perpendicular to the forward working direction; and
    generally pivotal relative to the frame about an upright axis;
  each second mounting assembly comprising a track and the second end portion of each toolbar section comprising a follower in mating engagement with the track of the respective second mounting assembly;
  the track of each second mounting assembly being arranged to guide movement of the respective toolbar section in the lateral direction as the second end portion of the toolbar section is displaced along the forward working direction;
  wherein each first mounting assembly comprises a track and the first end portion of each toolbar section comprises a follower in mating engagement with the track of each first mounting assembly;
  wherein the track of each first mounting assembly is oriented closer to the lateral direction than the track of each second mounting assembly such that each toolbar section is pivotal about the upright axis generally at the first end portion when the toolbar section is displaced in the forward working direction at the second end portion.

The embodiment as described in more detail hereinafter provides angular adjustment of each toolbar section with a single actuator and two respective tracks by orienting the track at the first mounting assembly of the respective toolbar section more laterally than the track at the respective second mounting assembly thereof so as to locate a respective upright axis about which the respective toolbar section pivots relative to the frame generally at the first end portion of the toolbar section.

Preferably, the track of each first mounting assembly is oriented substantially laterally so as to be closer in orientation to the lateral direction than to the forward working direction.

Optionally, the track of each first mounting assembly is curved. When the track of each first mounting assembly is curved, in one instance thereof the track is curved such that it is convex at a front of the track in the forward working direction and concave at a rear of the track in a direction opposite the forward working direction. That is, the track of each first mounting assembly extends in an arc from a first track end to a second track end. Furthermore, the track comprises an intermediate track portion between the first and second track ends that is forward of the first and second track ends.

In one instance, the follower of the first end portion of each toolbar section comprises a pin protruding from at least one of upper and lower sides of the first end portion. When the follower of the first end portion comprises the pin, it is preferable that the pin comprises an upper pin portion protruding from the upper side of the first end portion and a lower pin portion protruding from the lower side of the first end portion.

When the follower of the first end portion comprises the pin, each first mounting assembly further comprises upper and lower bearing surfaces slidably receiving the respective toolbar section therebetween and the track of each first mounting assembly comprises at least one slot formed in at least one of the upper and lower bearing surfaces. When the pin has the upper and lower pin portions, the at least one slot comprises a slot in each of the upper and lower bearing surfaces.

Preferably, at least one of the first mounting assemblies further comprises a rear bearing surface for engaging the respective toolbar section. When the at least one of the first mounting assemblies includes the rear bearing surface, it is preferable that the rear bearing surface is generally convex and the track of the at least one of the first mounting assemblies is curved so as to follow curvature of the rear bearing surface.

Preferably, the main frame comprises at least one set of bearing surfaces located at one of the second mounting assemblies comprising upper and lower bearing surfaces slidably receiving the respective toolbar section therebetween and the respective toolbar section comprises at least one stabilizing portion for stabilizing the toolbar section against twisting when the respective trailing arm is in the normal working position, said at least one stabilizing portion extending generally along the forward working direction so as to extend transversely to the longitudinal direction of the toolbar section between said upper and lower bearing surfaces.

BRIEF DESCRIPTION OF THE DRAWINGS

One embodiment of the invention will now be described in conjunction with the accompanying drawings in which:

FIG. 7 is a top plan view of the rear toolbar section of the left center section of the implement of FIG. 1;

FIG. 8 is a rear elevational view of the rear toolbar section of FIG. 7;

In the drawings like characters of reference indicate corresponding parts in the different figures.

DETAILED DESCRIPTION

Figure 1:
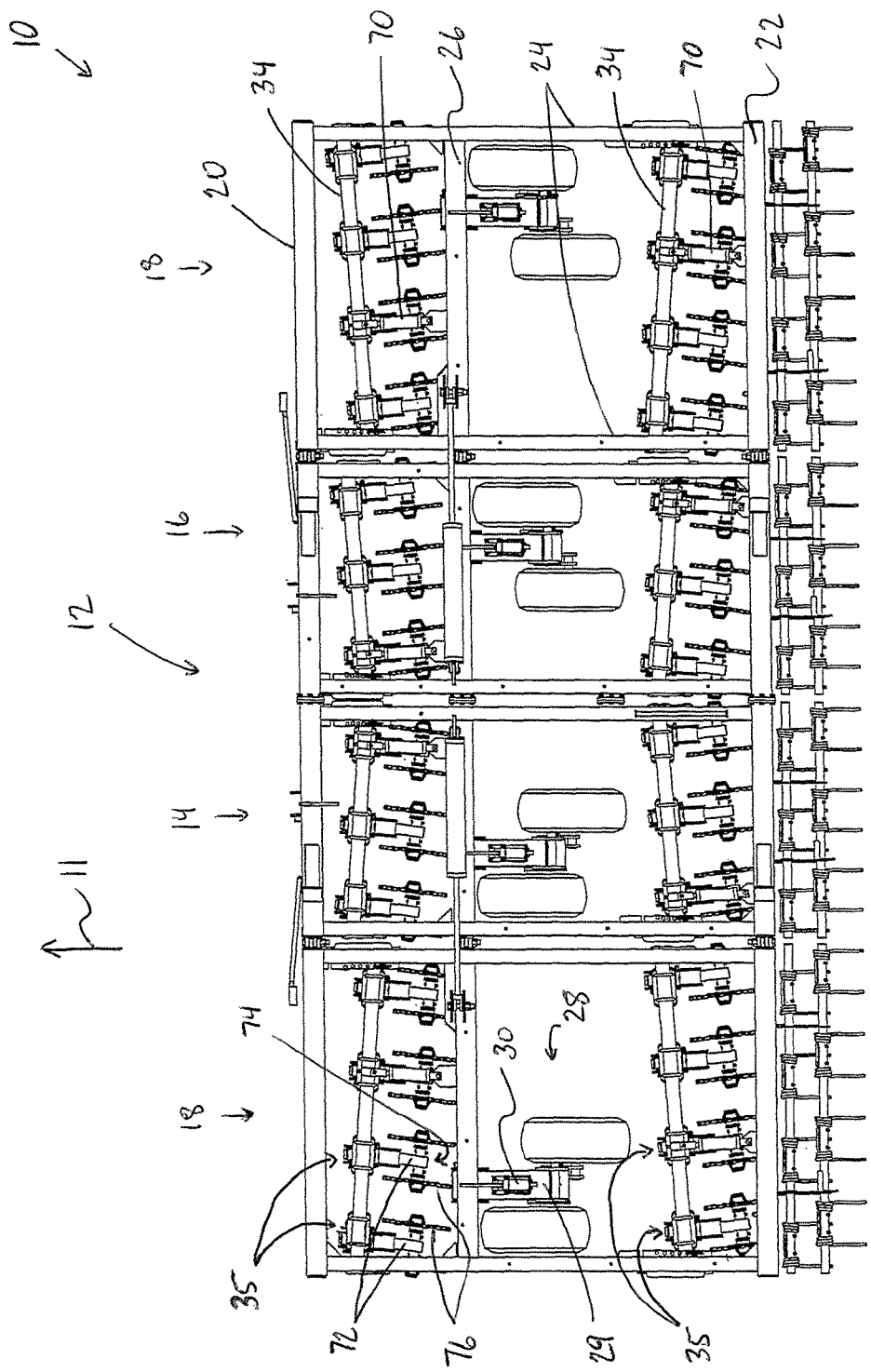
FIG. 1 is top plan view of the tillage implement according in a field working position.
Figure 2:
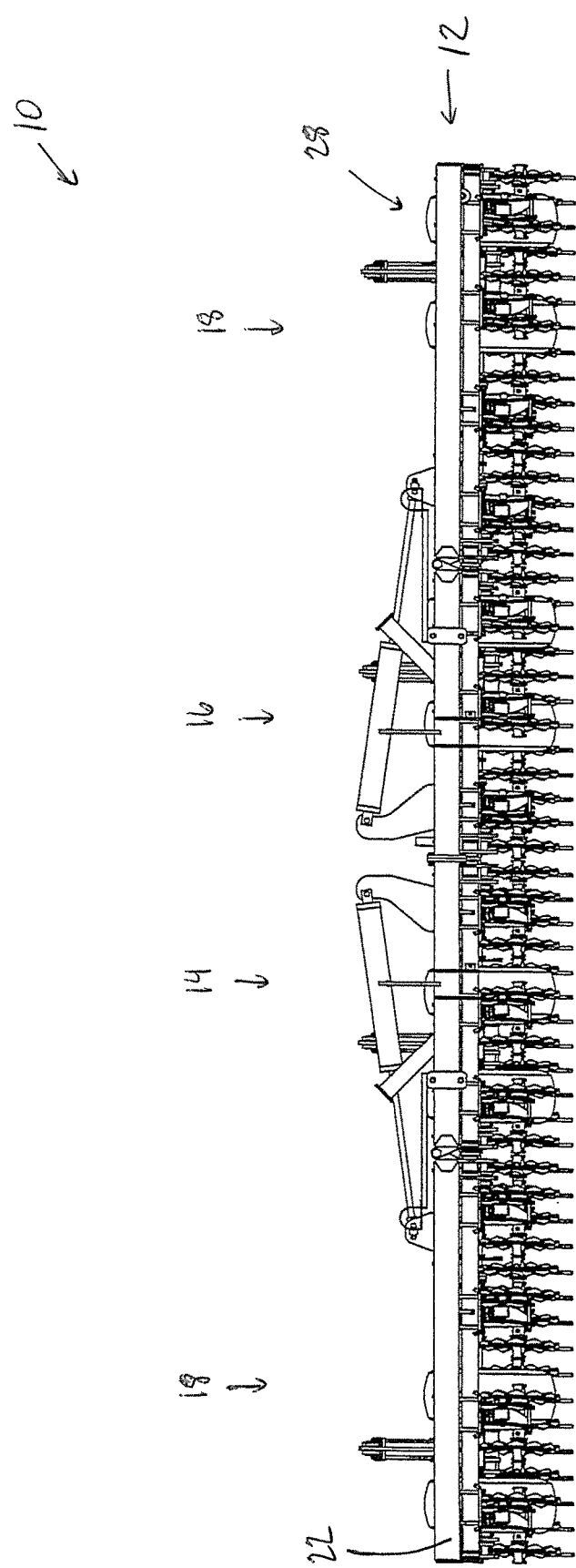
FIG. 2 is a rear elevational view of the tillage implement of FIG. 1 in the field working position.
Figure 3:
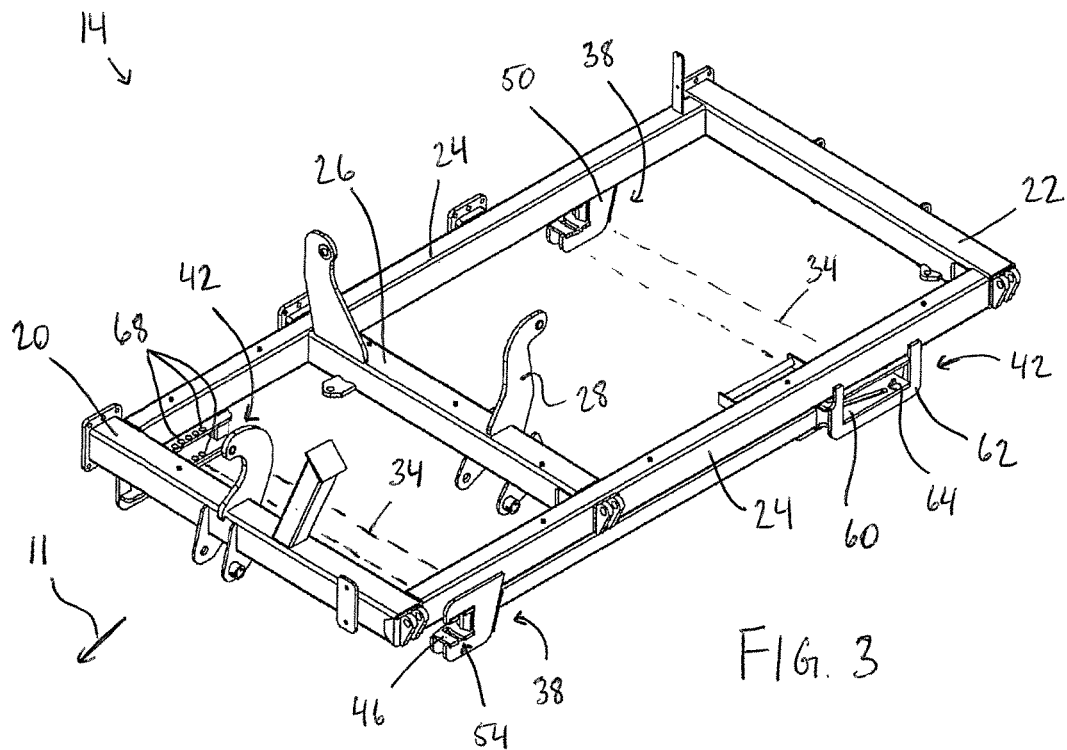
FIG. 3 is a left perspective view of the left center section of the frame of the tillage implement of FIG. 1.
Figure 4:
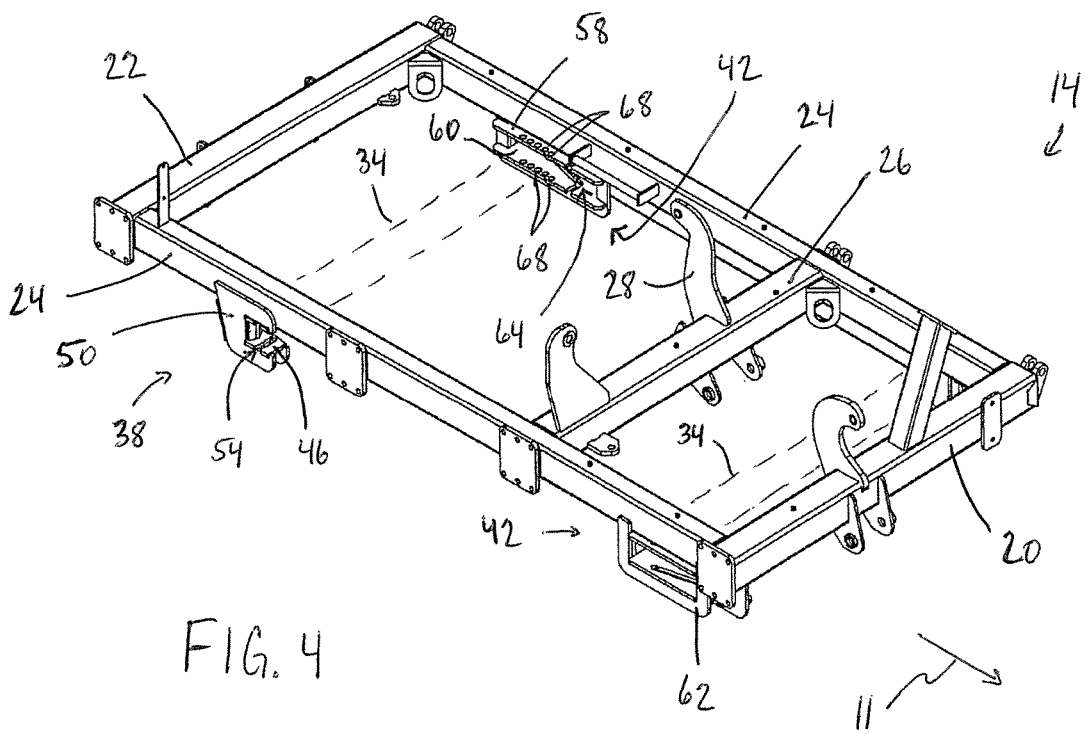
FIG. 4 is a right perspective view of the left center section of the frame of the tillage implement of FIG. 1.
Figure 6:
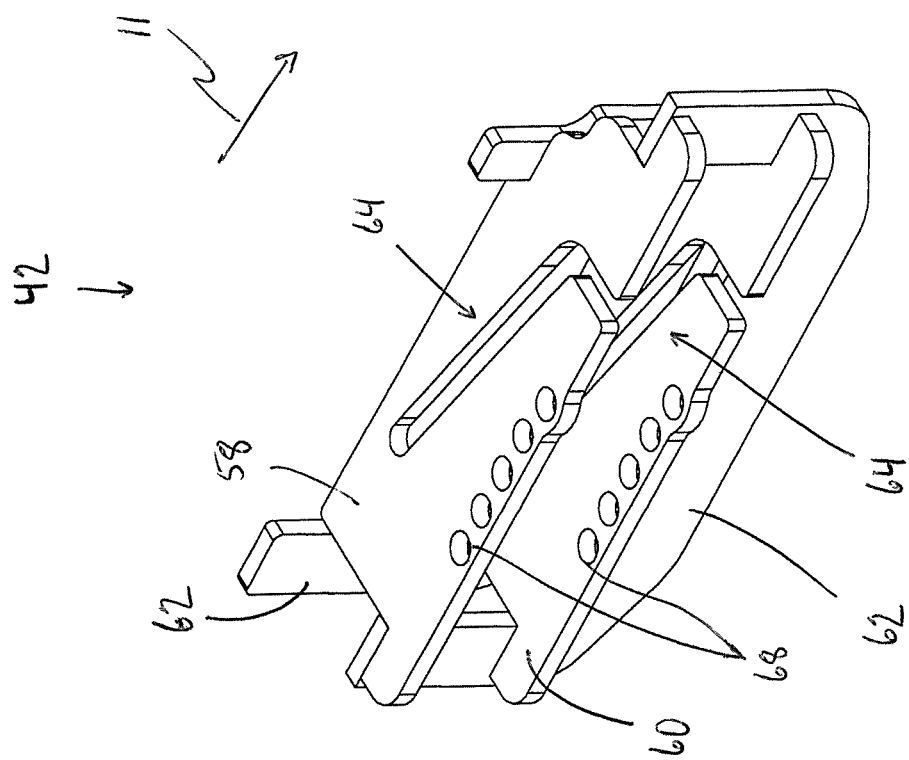
FIG. 6 is a perspective view of the second mounting assembly supporting the second end portion of the rear toolbar section of the left center section in FIG. 3 with a portion of one of the second support plates cutaway.
Figure 5:
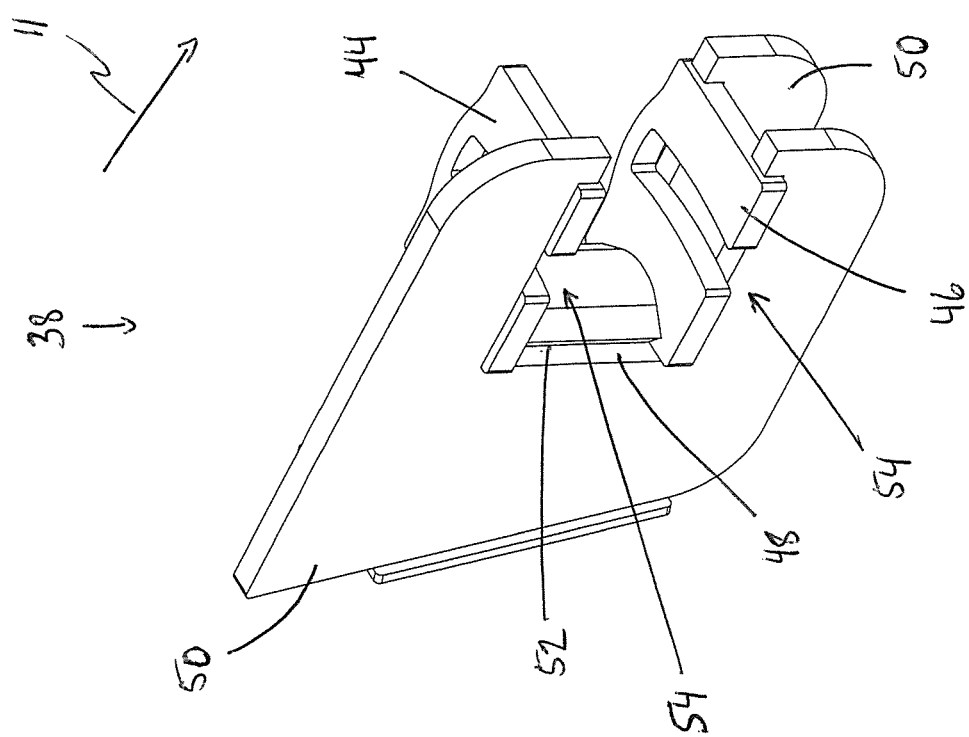
FIG. 5 is a perspective view of the first mounting assembly supporting the first end portion of a rear toolbar section of the left center section in FIG. 3 with a portion of one of the first support plates cutaway.

Referring to the accompanying figures, there is illustrated a tillage implement generally indicated by reference numeral 10. The implement 10 is suited for being towed by a tractor in a forward working direction 11 for working the ground, for example as in vertical tillage.

The implement includes a main frame 12 including a center section comprised of a left section 14 and a right section 16 joined so as to be fixed to one another. The frame also includes two wing sections 18 coupled along opposing sides of the center section so as to be coupled to the left and right sections respectively. Each wing section 18 is pivotal relative to the respective one of the center sections about a respective fold axis oriented generally in the forward working direction.

Each of the left section, the right section and the two wing sections 18 comprises a front beam 20 perpendicular to the forward direction, a rear beam 22 spaced rearward of the front beam and two side beams 24 extending in the forward direction along opposing sides of the section between the rear beam and the front beam, such that the frame members of each section are in a rectangular configuration lying generally in a horizontal plane. Each section further comprises an intermediate beam 26 spanning between the two side beams parallel to the front and rear beam at an intermediate location spaced from both the front and rear beams.

In a field working position all of the frame members of the sections lie in a generally common horizontal plane with the front beams aligned with one another to form a common front end of the main frame while the rear beams are similarly all aligned along the rear end of the main frame. For transport, the two wing sections are folded upwardly and inwardly overtop the left and right sections of the center section respectively into a folded transport position.

Each of the left, right and two wing sections further comprises at least one wheel assembly 28 supported on the intermediate beam thereof. Each wheel assembly includes a leg 29 pivotal about a horizontal axis in a lateral direction oriented perpendicularly to the forward working direction. Each leg is pivoted at a forward upper end to the respective intermediate beam to extend generally downward and rearward to a bottom end. The bottom ends of the legs support respective wheels thereon for rolling movement in the forward working direction.

A hydraulic actuator 30 is associated with each wheel assembly and is connected between the leg 29 and the intermediate beam such that extension and retraction of the hydraulic actuator causes the wheels of the wheel assembly to be raised and lowered relative to the frame sections. By raising the wheels relative to the frame, the frame can be towed across the field in a working configuration. Alternatively by lowering the wheels relative to the frame, the frame is raised and carried solely on the wheels of the wheel assemblies for transport in a disengaged position. The wheels of the center sections remain lowered for supporting the implement thereon in the transport position when the wings are folded up.

Each of the sections of the main frame supports a plurality of toolbar sections 34 thereon. Each toolbar section comprises a rigid tube member of generally rectangular cross section which supports a plurality of tillage units 35 at spaced positions therealong. Each of the left section 14, the right section 16, and the two wing sections 18 support one toolbar section adjacent the forward end thereof and one toolbar section adjacent the rearward end thereof with an equal number of tillage units on the front and rear toolbar section within each section of the main frame. Each toolbar section is angularly adjustable relative to the forward working direction by arranging the toolbar sections for pivotal movement relative to respective upright axes which will be described later.

Each toolbar section 34 is supported at a respective first end portion 36 on one of the side beams of the respective frame section by a first mounting assembly 38. Similarly each toolbar section includes an opposing second end portion 40 supported on the other side beam of the respective frame section by a second mounting assembly 42. Within each frame section the first end portions of the front and rear toolbar sections are supported on opposing side beams 24 of the section such that the two toolbar sections of each frame section extend in opposing lateral directions from the first end portion to the second end portion thereof.

Each first mounting assembly comprises an upper plate 44 directly adjacent the bottom side of the respective side beam and a lower plate 46 parallel and spaced below the upper plate by the thickness of the toolbar section 34 for snugly and slidably receiving the first end portion of the toolbar section therebetween. Each first mounting assembly further comprises a rear plate 48 extending between the upper and lower plates at rear ends thereof so as to be perpendicular to the forward working direction. The lower plate 46 of the first mounting assembly is further supported by a pair of first support plates 50 oriented in respective vertical planes parallel and spaced apart from one another and oriented in the forward working direction. The two first support plates are in a generally C-shaped configuration so as to be coupled along top portions thereof to respective outer sides of the respective side member while extending below the lower plate in fixed connection therewith to maintain the lower plate in fixed parallel relation with the upper plate. The first support plates also comprise rear portions extending downwardly from the top portions thereof that are rearwardly adjacent the rear plate 48. The first support plates are also fixed to the rear plate 48 at the rear portions with the first support plates being supported on the outer sides of the rear plate.

The rear plate 48 supports a rear bearing surface 52 thereon which engages a rear side of the toolbar section along the first end portion 36 thereof. The rear bearing surface has a front side facing generally in the forward working direction. The rear bearing surface is curved about a vertical axis so as to be generally convex in shape in the forward working direction at the front side of the rear bearing surface.

Each of the upper 44 and lower 46 plates of the first mounting assembly 38 comprises a slot 54 formed therein which is generally curved such that the slot follows a curvature of the rear bearing surface 52. That is, the slot has a middle slot portion and opposing end slot portions extending outwardly from the middle slot portion. Each end slot portion extends outwardly in the respective lateral direction and rearwardly. The end slot portions extend further laterally outwardly than rearwardly such that the slot is oriented primarily in the lateral direction. As such, the slot is convex at a front thereof, generally in the forward working direction, and concave at a rear of the slot, generally in a rearward direction opposite the forward working direction. The slots in the upper and lower plates receive a pair of followers 56 at the first end portion of the toolbar section protruding from the upper and lower surfaces of the tube forming the toolbar section. The two followers comprise upper and lower pin portions respectively slidably received within the slots of the upper and lower plates that define a track of the first mounting assembly effectively guiding a corresponding movement of the toolbar section substantially in the lateral direction. In the illustrated embodiment, the pin portions are generally circular in cross section so that pivoting is permissible thereat while sliding along the respective slot; the cross section of the pin portions may define another shape so long as the pivoting is afforded thereby. Furthermore, the upper and lower plates define a socket of the first mounting assembly with openings in the lateral direction for permitting sliding of the toolbar section in that direction.

The second mounting assembly 42 similarly comprises an upper plate 58 mounted directly adjacent the bottom side of the respective side beam and a lower plate 60 mounted parallel and spaced below the upper plate by a suitable distance to snugly and slidably receive the rectangular cross section of the toolbar section therebetween. Similarly to the lower plate 48 of the first mounting assembly, the lower plate 60 of the second mounting assembly is further supported by a pair of second support plates 62 oriented in respective vertical planes parallel and spaced apart from one another and oriented in the forward working direction. Each second support plate is in a generally U-shaped configuration so as to be coupled at opposing ends to the respective outer side of the respective side member while extending below the lower plate in fixed connection therewith to maintain the lower plate in fixed parallel relation with the upper plate. Similarly to the first mounting assembly, the upper and lower plates of the second mounting assembly define a socket of the second mounting assembly with openings in the lateral direction for allowing sliding of the toolbar section in that direction.

Figure 9A:
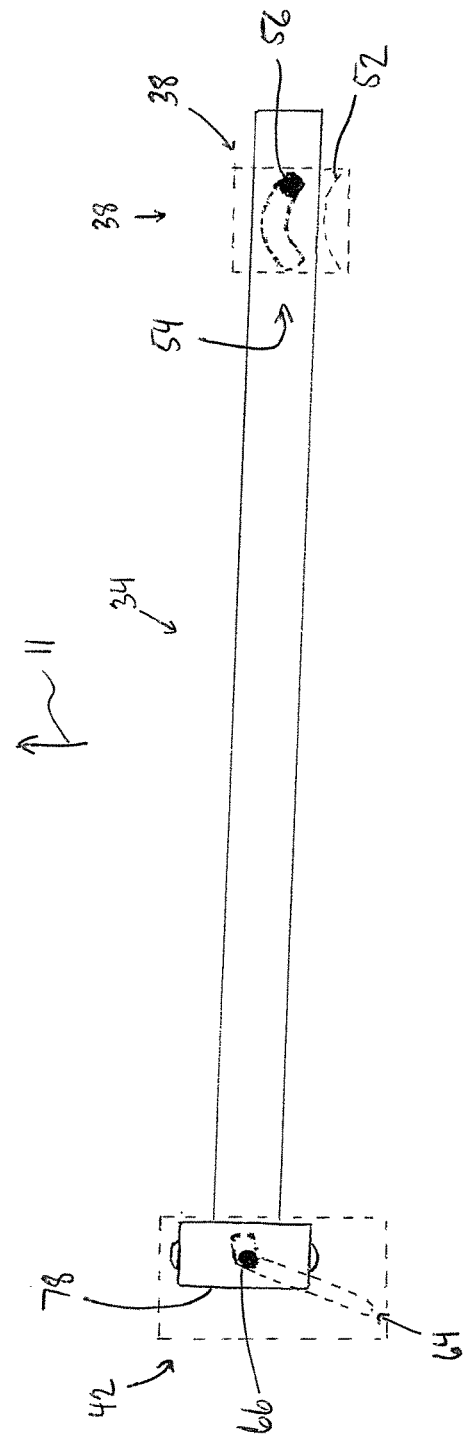
FIG. 9A is a schematic view of the rear toolbar section of FIG. 7 in a first limit of angular orientation of the toolbar section.
Figure 9B:
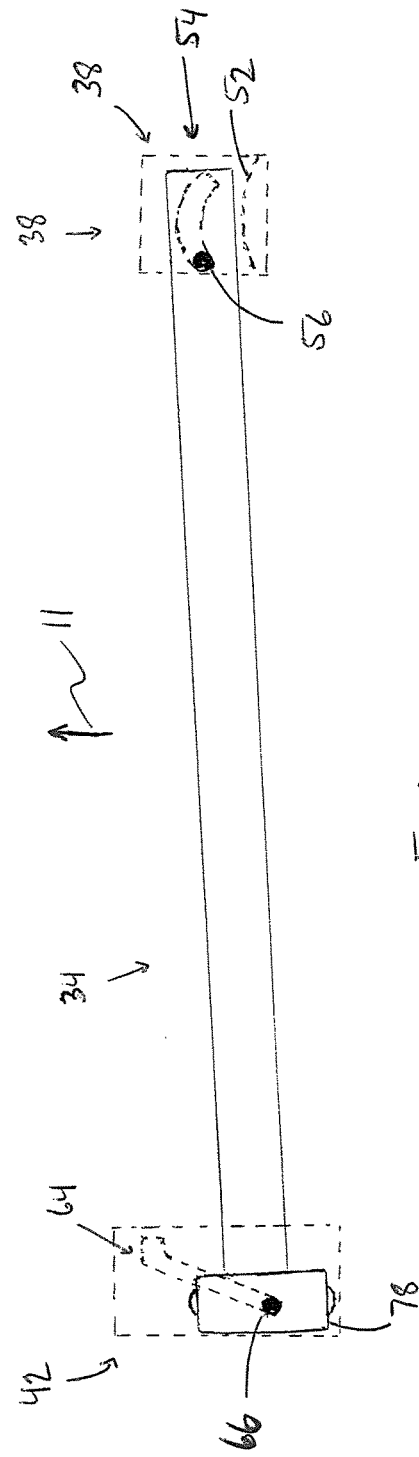
FIG. 9B is a schematic view of the rear toolbar section of FIG. 7 in a second limit of the angular orientation of the toolbar section.

In the second mounting assembly the upper 58 and lower 60 plates are longer in the forward working direction 11 than the dimension of the tube of the toolbar section such that the toolbar section is slidable in the working direction along the length of the socket formed by the upper and lower plates of the second mounting assembly. Each of the upper and lower plates of the second mounting assembly comprises a slot 64 formed therein which extends at an inclination to the forward working direction. That is, the slot 64 extends substantially in the forward working direction 11 and to a lesser degree in the lateral direction towards the corresponding first mounting assembly (supporting the respective toolbar section) as more clearly shown in FIGS. 9A-9B. Furthermore, the middle slot portions of the slots of the first mounting assembly 38 are substantially horizontally aligned with midpoints of the slots of the corresponding second mounting assembly across the respective frame section so as to be located at approximately the same distance rearward from the front beam 20 of the respective section of the main frame.

The slots 64 in the upper and lower plates of the second mounting assembly receive a pair of followers 66 protruding from the upper and lower surfaces at the second end portion 40 of the tube forming the toolbar section. The two followers comprise upper and lower pin portions respectively slidably received within the slots 64 of the upper 58 and lower 60 plates of the second mounting assembly. Similarly to the followers at the first end portion, the pin portions 66 at the second end portion are generally circular in cross section in the illustrated embodiment but may define another shape in alternative embodiments so that a degree of pivoting is permissible thereat while sliding along the respective slot.

Angular orientation of each toolbar section is adjusted by displacing the toolbar section at the second end portion along the forward working direction. As the track of the second mounting assembly is oriented substantially in the forward working direction and the track of the first mounting assembly is oriented closer to the lateral direction than same, the displacement of the toolbar section effects less translational movement of the toolbar section at the first end portion 36 than at the second end portion 40 accommodated by pivoting at the first mounting assembly 38 about the respective upright axis located thereat. As such, orientations of each of the tracks of the first and second mounting assemblies relative to one another locate each upright axis generally at the first end portion such that the toolbar section is pivotal thereat. Furthermore, the corresponding movement of the toolbar section in the lateral direction afforded by the inclination of the track of the second mounting assembly effects sliding of the toolbar section laterally along the track of the first mounting assembly. When the followers 66 at the second end portion are in a forwardmost position within the track of the second mounting assembly as more clearly illustrated in FIG. 9A, the followers 56 at the first end portion are at an outer end of the track of the first mounting assembly such that the toolbar section is at a first limit of its angular orientation. Further, when the followers at the second end portion are in a rearwardmost position within the track of the second mounting assembly shown in FIG. 9B, the followers 56 at the first end portion are at an inner end of the track of the second mounting assembly such that the toolbar section is at a second limit of its angular orientation. The angular orientation of the toolbar section may be adjusted between the first and second limits. The amount of lateral displacement afforded by the tracks of both the first and second mounting assemblies, in addition to orienting the front and rear toolbar sections of each frame section in opposing lateral directions relative to one another, ensures that the tillage units of the forward and rearward ones of the toolbar sections remain optimally spaced relative to one another in the lateral direction despite the angular adjustment of the toolbar sections relative to the main frame.

To maintain orientation of the toolbar section at a selected angular orientation relative to the frame section, a plurality of pin connections 68 in the form of a row of apertures are provided in each of the upper and lower plates of the second mounting assembly in which each aperture in the upper plate is aligned with a corresponding aperture in the lower plate to define a corresponding pair. The apertures are located in the portion of the plate which protrudes laterally outward from the side beam upon which they are supported towards the opposing side beam of the respective section to provide ready access to the pin connections. To fix the position of the toolbar section relative to the frame a pair of pin members are inserted through the pin connection apertures directly adjacent both the front and rear sides of the toolbar section adjacent the second end thereof by inserting each pin member through a corresponding pair of apertures. The two pin members together restrict movement of the second end of the toolbar section in either direction aligned with the forward working direction.

In the illustrated embodiment a hydraulic actuator 70 is coupled to each toolbar section at a location thereon adjacent the second mounting assembly at a piston end of the actuator. The actuator extends generally in the forward working direction to a cylinder end pivotally coupled to the main frame typically at one of the front, intermediate, or rear beams in the illustrated embodiment.

Extension and retraction of the hydraulic actuator effect displacement of the second end portion of the respective toolbar section in the forward working direction relative to the main frame by sliding the followers along the respective track. The hydraulic actuators 70 extend generally horizontally at a common elevation with the toolbar sections such that the toolbar sections and the hydraulic actuators all lie in a common horizontal plane with one another. The force of extension and retraction of the actuators 70 acting on the respective toolbar section is thus aligned with the toolbar sections and with the sliding direction of the followers within the respective tracks so as to prevent any undesirable moments being applied to the toolbar sections.

The hydraulic actuators are suitably sized so as to be arranged to fully support and fix the orientation of the toolbar sections in the forward working direction even if the pins are not used to anchor the toolbar sections. In this manner, the hydraulic actuators can be used to adjust the angular orientation of the toolbar sections while the implement is in use and being towed across a field.

In some instances, the angular adjustment of the toolbar sections can be performed manually with the pin connection being used alone to retain the selected orientation of the toolbar sections. Even when using hydraulic actuators to displace the orientation of the toolbar sections however, the pin members in the pin connections can be used to maintain the orientation even after the hydraulics are disconnected or relieved of pressure for more precisely retaining the position of the toolbar sections than relying on hydraulics alone. No pins are used when it is desirable to allow adjustment of the angular orientation during normal use in the field working position as the hydraulics alone are used in this instance to lock the position of the toolbar sections at a selected orientation.

As noted above, each toolbar section includes a plurality of tillage units 35 supported at spaced positions thereon in the longitudinal direction of the toolbar section.

Each tillage unit comprises a trailing arm 72 extending generally downward and rearward at an inclination to extend outwardly towards a trailing end 74. A downward biasing force provided by a spring member defining a biasing member biases the trailing arm downward into a working position while allowing the trailing arm to be pivoted upwardly at the rear end thereof against the force of the spring into a deflected position.

Each tillage unit supports two coulter disks 76 at the trailing end of the trailing arm such that the disks are arranged for tilling engagement with ground. The disks are rotatably supported on the trailing end of the trailing arm to extend perpendicularly to the longitudinal direction thereof in a substantially horizontal orientation.

Due to the trailing configuration of the disks 76 relative to the respective toolbars upon which they are supported, the angular adjustment of the toolbar sections relative to the main frame affects the lateral position of the disks 76 relative to the frame. As noted before, the lateral extent of the track of the second mounting assembly and the substantial lateral orientation of the track of the second mounting assembly accommodate the movement of the second end portions in the forward working direction so as to maintain spacing in the lateral direction between each one of the disks on the forward and rearward ones of the toolbar sections of each frame section.

As the tillage units are moved into the field working position for working engagement with the ground by raising the wheels of the implement so as to lower the main frame, the trailing configuration of the coulter disks relative to the toolbar sections causes the toolbar section to be pulled rearwardly as the implement 10 is moved in the forward working direction. The rear bearing surface at the first mounting assembly abuts the rear surface of the toolbar section thereof so as to bear at least a portion of the force on the trailing arms typically on the respective track and followers at the first end portion. The convex shape of the rear bearing surface at the front side thereof affords support to the respective toolbar section in the forward working direction irrespective of its pivotal position.

Further support for each toolbar sections against effects of working engagement with the ground by the coulter disks is provided by a stabilizing member 78 in the form of a square rigid tube mounted at the end of the second end portion perpendicularly to the longitudinal direction of the respective toolbar section in a generally T-shaped configuration. The stabilizing member thus extends generally in the forward working direction 11 of the implement so as to extend transversely to the longitudinal direction of the toolbar section between the upper and lower bearing surfaces of the second mounting assembly. The stabilizing member defines a stabilizing portion of the toolbar section for stabilizing against any moments applied to the toolbar section resulting from the engagement of the disks with the ground.

Since various modifications can be made in my invention as herein above described, and many apparently widely different embodiments of same made within the spirit and scope of the claims without department from such spirit and

The invention claimed is:

1. A tillage implement comprising:
a main frame arranged for connection to a towing vehicle and supported for movement across the ground in a forward working direction with the towing vehicle;
a plurality of toolbar sections supported on the main frame so as to be oriented transversely to the forward working direction;
each toolbar section comprising:
   a toolbar member extending transversely to the forward working direction in a respective longitudinal direction of the toolbar member between first and second end portions of the toolbar member at longitudinally opposed ends of the toolbar member;
   a first mounting assembly coupling the first end portion of the toolbar member to the main frame;
   a second mounting assembly coupling the second end portion of the toolbar member to the main frame;
   a plurality of tillage units supported on the toolbar member, each tillage unit having a trailing arm extending generally rearwardly from a forward end supported on the respective toolbar member to an opposing trailing end such that the trailing end is movable upwardly from a normal working position to a deflected position and a coulter disk supported on the trailing end of the trailing arm so as to be arranged for tilling the ground;
   the first mounting assembly comprising a first track fixedly supported on the main frame and a first follower supported on the first end portion of the toolbar member in mating engagement with the first track such that the first follower is slidable relative to the main frame in a lateral direction perpendicular to the forward working direction and generally pivotal relative to the main frame about an upright axis;
   the second mounting assembly comprising a second track fixedly supported on the main frame and a second follower supported on the second end portion of the toolbar member in mating engagement with the second track;
   the second track being sloped relative to the forward direction and relative to the lateral direction so as to be arranged to guide movement of the respective toolbar section in the lateral direction as the second end portion of the toolbar section is displaced in the forward working direction;
   the first track being oriented closer to the lateral direction than the second track such that the toolbar member is pivotal about the upright axis generally at the first end portion when the toolbar member is displaced in the forward working direction at the second end portion; and
   the first and second tracks being positioned relative to one another so as to be adapted to both (i) adjust position of the first end portion of the toolbar member in the lateral direction relative to the main frame and (ii) angularly adjust the toolbar member relative to the forward working direction about the upright axis of the first end portion of the toolbar member responsive to displacement of the second follower relative to the second track in the forward working direction.

2. The implement according to claim 1, wherein the first track of each first mounting assembly is closer in orientation to the lateral direction than to the forward working direction.

3. The implement according to claim 1, wherein the first track of each first mounting assembly is curved.

4. The implement according to claim 3, wherein the first track of each first mounting assembly is convex at a front of the track and concave at a rear of the track.

5. The implement according to claim 3, wherein the first track of each first mounting assembly extends in an arc from a first track end to a second track end.

6. The implement according to claim 1, wherein the first track of each first mounting assembly further comprises an intermediate track portion between a first track end to a second track end that is forward of the first and second track ends.

7. The implement according to claim 1, wherein the first follower on the first end portion of each toolbar member comprises a pin protruding from at least one of upper and lower sides of the first end portion.

8. The implement according to claim 7, wherein each pin comprises an upper pin portion protruding from the upper side of the first end portion and a lower pin portion protruding from the lower side of the first end portion of the respective toolbar member.

9. The implement according to claim 1, wherein each first mounting assembly further comprises upper and lower bearing surfaces slidably receiving the respective toolbar member therebetween and the first track of each first mounting assembly comprises at least one slot formed in at least one of the upper and lower bearing surfaces.

10. The implement according to claim 9, wherein said at least one slot of each first track comprises a slot in each of the upper and lower bearing surfaces.

11. The implement according to claim 1, wherein the first mounting assembly of each toolbar section further comprises a rear bearing surface for engaging the respective toolbar member.

12. The implement according to claim 11, wherein the rear bearing surface of each first mounting assembly is generally convex and the first track of the first mounting assembly is curved so as to follow curvature of the rear bearing surface.

13. The implement according to claim 1, wherein each second mounting assembly further comprises a set of bearing surfaces comprising upper and lower bearing surfaces slidably receiving the toolbar member therebetween and wherein the respective toolbar member comprises at least one stabilizing portion for stabilizing the toolbar member against twisting, said at least one stabilizing portion extending generally in the forward working direction so as to extend transversely to the longitudinal direction of the toolbar member between said upper and lower bearing surface.

* * * * *